J. C. STIMSON

Aug. 25, 1931. LUMINOUS DISPLAY OR REFLECTOR SIGN Re. 18,166

Original Filed July 9, 1923 3 Sheets-Sheet 1

Inventor.
JONATHAN C. STIMSON.
By John N. Bruninga
Atty.

J. C. STIMSON

Aug. 25, 1931. LUMINOUS DISPLAY OR REFLECTOR SIGN Re. 18,166

Original Filed July 9, 1923 3 Sheets-Sheet 2

Inventor:
JONATHAN C. STIMSON.
By John W. Bruninga
Atty.

J. C. STIMSON

Aug. 25, 1931. LUMINOUS DISPLAY OR REFLECTOR SIGN Re. 18,166

Original Filed July 9, 1923 3 Sheets-Sheet 3

Inventor:
JONATHAN C. STIMSON.
By John N. Bruninga
Atty.

Reissued Aug. 25, 1931 Re. 18,166

UNITED STATES PATENT OFFICE

JONATHAN C. STIMSON, OF CHICAGO, ILLINOIS

LUMINOUS DISPLAY OR REFLECTOR SIGN

Original No. 1,809,761, dated June 9, 1931, Serial No. 650,403, filed July 9, 1923. Application for reissue filed June 15, 1931. Serial No. 544,649.

This invention relates to luminous displays, and more particularly to luminous display or reflector signs.

Figure 1:
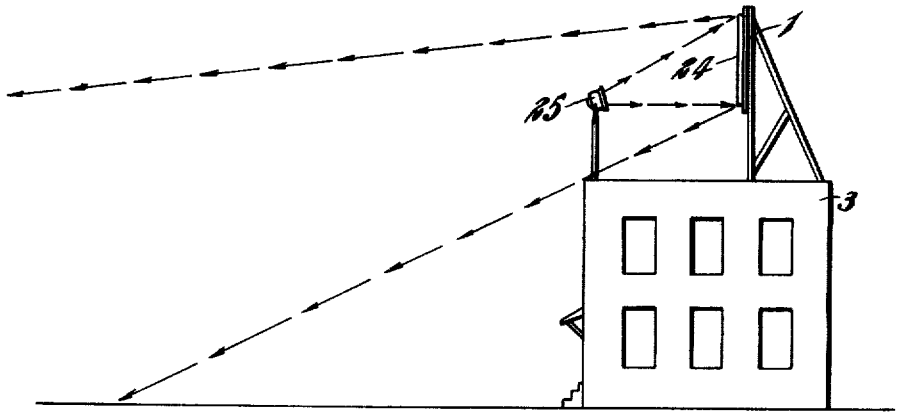
Figures 1 and 2 are a side elevation and a plan view respectively showing an illustrative luminous display or reflector sign embodying this invention.

Display signs as heretofore made are of two general types, namely: those in which the light is radiated from lamps forming the display characters of the sign, and those in which the characters are displayed by diffuse reflection from the surfaces of the character on the sign area.

Where the light is radiated directly from the lamps forming the characters, only a small part of the total emitted light is useful; for only a small percentage of the total emitted light from a bulb or a series of bulbs is utilized for display purposes, keeping in mind that the light from a bulb is radiated in a sphere of which the source forms the center and that the useful light for display purposes forms only a small sector of the sphere. Accordingly since the intensity of the illumination varies inversely as the square of the distance, it necessarily follows that in order to obtain a practical range of visibility, bulbs of relatively high candle power must be used.

Not only is a display sign employing bulbs for direct radiation wasteful in energy, but the maintenance cost in the replacement of bulbs and repairs generally is also high, especially since in order to secure a display of given characters, these characters must be built up by a series of lights requiring a multiplicity of bulbs. Moreover such characters being built up by spaced point sources of light can only approximate the outline of the character, and require high power lamps to make them visible at a distance. Such signs are, moreover, very expensive to install and operate.

In luminous display signs in which the sign area is painted or formed to provide display characters which are illuminated by directing light from a suitable source or sources onto the sign area, the characters are visible by diffuse reflection. Such reflection fills the entire hemisphere in front of the sign although serving a useful purpose within only a small zone. By reason of the nature of the surface of such a sign a large part of the light is absorbed, even when the sign is painted with ordinary paint. In order to avoid high lights, flat paints are sometimes used resulting in a matte surface. From such a surface the light is even more fully diffused and there is a greater absorption of light. As a result the sign, in proportion to the amount of illumination used is effectively visible at short distances only. Further, even at short distances such signs lack the brilliance of electric signs.

One of the objects of this invention, therefore, is to provide means of creating luminous display or reflector signs in which the light directed on the sign area and more particularly on the display characters, is so emitted or reflected as to be confined within a selected field from which the display characters are visible; this is accomplished in the illustrated embodiments of this invention by reflecting the light from the display characters in the form of a spreading beam or beams into that selected, visible field.

Another object of this invention is to provide a luminous display or reflector sign having display characters visible from within a selected field, whereby the light emitted from the characters is confined within that field; this is accomplished in the illustrated embodiments of this invention by providing the characters with reflecting surfaces which are constructed and arranged to reflect the light impinging thereon in the form of a spreading beam or beams and into that selected visible field in order to display the characters within that field.

Further objects will appear from the detail description taken in connection with the accompanying drawings.

Generally stated and in accordance with this invention the luminous display or reflecting sign has a sign character or characters provided with or formed of reflecting units arranged to form the outline or outlines of the character or characters, each of these units has a reflecting area adapted to reflect light incident thereon from a distant source back in the general direction of the light source, and the units have means or are constructed to slightly spread the reflected light. The reflecting units are usually arranged along the strokes of the character to outline the same. These units may be arranged in clusters along the character. In accordance with an illustrative embodiment of this invention the reflecting surfaces forming the characters of the luminous display or reflector sign are in the form of triple reflectors constructed as shown and described in Patent No. 1,671,086, issued May 22, 1928.

Figure 4:
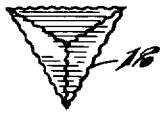
Figures 4 and 5 are views illustrating the principles of operation of a reflector used in the luminous display sign embodying this invention.
Figure 5:
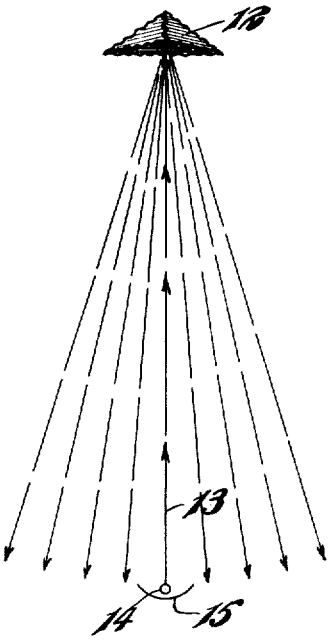
Figure 6:
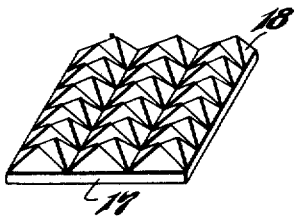
Figure 6 is a perspective view of a prismatic plate used in the display sign.

A triple reflector comprises three reflecting surfaces arranged to intersect at a common point and such a reflector has the property of reflecting incident beams back to their source irrespective (within limits) of the angle of incidence of such a beam with respect to the axis. Where the triple reflector is a prism causing reflection of the incident beam, the limiting angle of incidence (with respect to the axis) can be increased while the loss of reflected rays is decreased for any given angle of incidence. While, however, in a central reflector (in which the reflecting surfaces are at right angles to each other so as to form in effect the corner of a cube and which is provided with optically plane surfaces) the incident beams are reflected directly back to the source, the triple reflector described and shown in the patent referred to is so constructed as to reflect the impinging light in the form of a spreading beam or beams. This is accomplished in an embodiment of the invention described in the patent referred to, by deviating the reflecting surfaces thereof slightly from true right angular relation and by distorting the surfaces, so as to vary from the true optical surface of a central reflector; specifically stated this latter is accomplished in a prismatic reflector by forming the reflector of pressed glass and by so controlling the degree of polish of the reflecting surfaces as to leave the same sufficiently rough and undulating to secure spread reflection This is illustrated in Figures 4 and 5, where the surfaces of the triple reflector 12 are shown undulating (on an exaggerated scale) so that an incident beam 13 from a source of light 14 provided with a reflector 15 (such as a parabolic reflector) is reflected in the form of a spreading beam which is of uniform intensity, the spread of the beam being controlled by the degree of polish given the reflecting surfaces.

As a practical illustrative embodiment a reflecting area is formed by a prismatic plate 17 of presesd glass, which has formed on the back thereof a series of triple reflecting prisms 18 arranged in continuous relation, th reflecting surfaces of these prisms being formed by pressing in a suitable mold and the polish of the reflecting surfaces being controlled by the degree of polish given the mold surfaces. Such a prismatic plate has the property of reflecting incident substantially parallel beams of light back past the source in the form of a cone having the plate as the apex of the cone and the source of light in the axis of the cone, regardless of the position of the light source with respect to the reflector within wide angular limits. If the reflecting plate is transparent, reflection takes place through total internal reflection, the angular range through which the transparent total triple reflecting prisms function being sufficient for most display signs. If service conditions require an angular range and quantity of reflection beyond the reflecting range of the transparent primatic plate, the back or figured face of the plate may be silvered, thus widening the range through which all of the units of the reflector will function.

Figure 7:
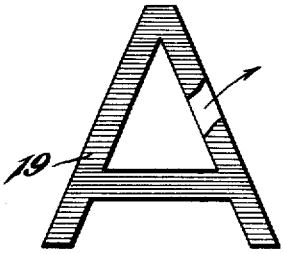
Figures 7, 8 and 9 show different applications of the reflector or prismatic plate in the formation of display characters on the luminous display or reflector sign embodying this invention.
Figure 10:
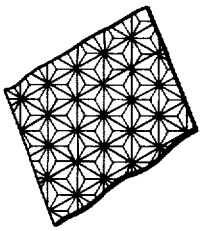
Figures 10, 11 and 12 are enlargements of portions of Figures 7, 8, and 9 respectively, showing the reflecting units forming the outline of the character.

The application of the reflecting prism to luminous display or reflector signs can be varied to suit requirements. Thus as shown in Figures 7 and 10, the characters 19 may be formed of pressed glass having formed on the back thereof a series of triple reflecting prisms whose reflecting surfaces are formed as heretofore described. These characters may either be used integrally or may be built up of parts, and such characters, or the parts thereof may be secured to a sign area in any suitable manner, it being understood, of course, that these prisms will project from the rear part of the character.

Figure 8:
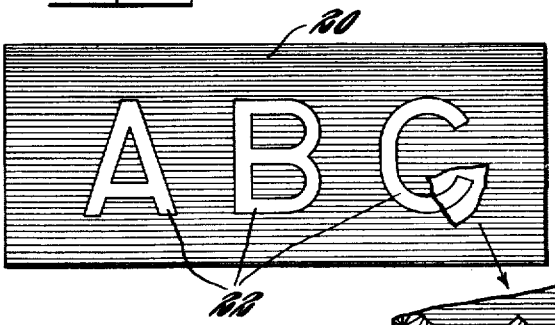
Figure 11:
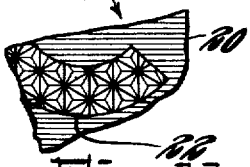
Figure 9:
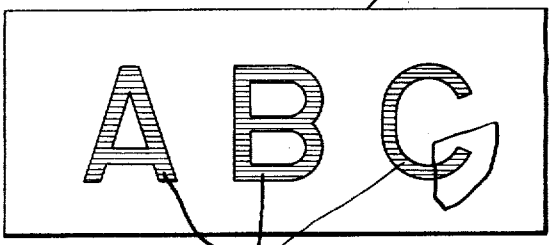
Figure 12:
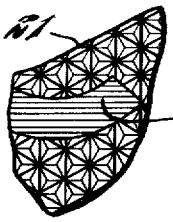

As shown in Figures 8 and 11, and 9 and 12 the sign area 20 or 21 may be formed of a prismatic plate, either in a single piece or built up from a series of plates, with the reflecting surfaces formed as heretofore described and with the triple reflecting prisms on the back of the sign area. The characters 22 or 23 may then be formed either by coating the sign area, leaving the outlines of the characters exposed as shown in Figures 8 and 11 or by coating the characters leaving the back-ground exposed as shown in Figures 9 and 12; in the first case, Figures 8 and 11, the characters will appear illuminated while in the second case Figure 9, the background will appear illuminated. It will be understood, of course, that any suitable opaque paint or other coating may be used and this coating may even be translucent and in varying colors so as to present a varied color display. It will, of course, be understood that the total sign area need not be formed as a reflecting surface in either case but only such portions as are required. With this form of sign area the display characters may be varied by removal of the coating and by the application of a new coating.

Figure 2:
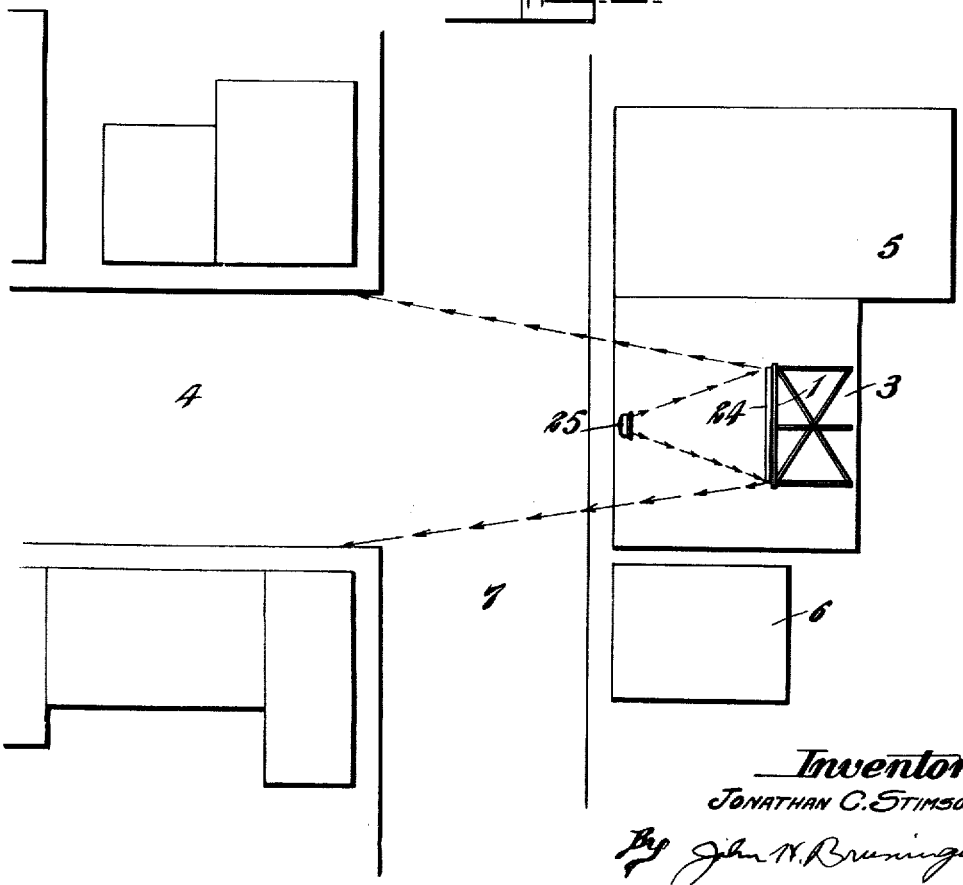

Figures 1 and 2 show the application of this invention to a location. The frame of the sign 1 is provided with a sign area 24, which is constructed in any manner as heretofore described while the light is directed on the sign area and the display characters thereon from a suitable source, such as one or more lamp bulbs and a reflector 25 which is arranged to project the light on the sign area and the display characters. Any suitable reflector of a high concentrating type, such as a parabolic reflector or a recently developed compensating Mangan mirror may be provided. Such a spot-light is so constructed and arranged as to throw a spreading beam in order to just cover the sign area and the display characters thereon. From the principles of the reflector as heretofore described, it will be readily seen that the light will be reflected from the display characters in the form of a spreading beam or beams and into the selected field (which is, in this case, along the street or thoroughfare 4), which field is that from which the luminous display is visible. It will be understood, of course, that the source of light and the impinging reflector 25 and the sign area are so relatively positioned and with respect to the visible field, and that the spread of the beam is controlled as heretofore described, as to confine the reflected light within the visible field. Accordingly maximum efficiency and maximum visibility and brilliance will be obtained with a minimum of current consumption. It will, of course, be understood that a lamp of sufficiently high candle power and a reflector of a sufficient size will be small relative to the sign area so that the sign area and the characters thereon will not be obscured by the presence of the source within the reflected beam; as a practical proposition the light projecting reflector 25 will really be invisible at a comparatively short distance from the sign area.

Figure 3:
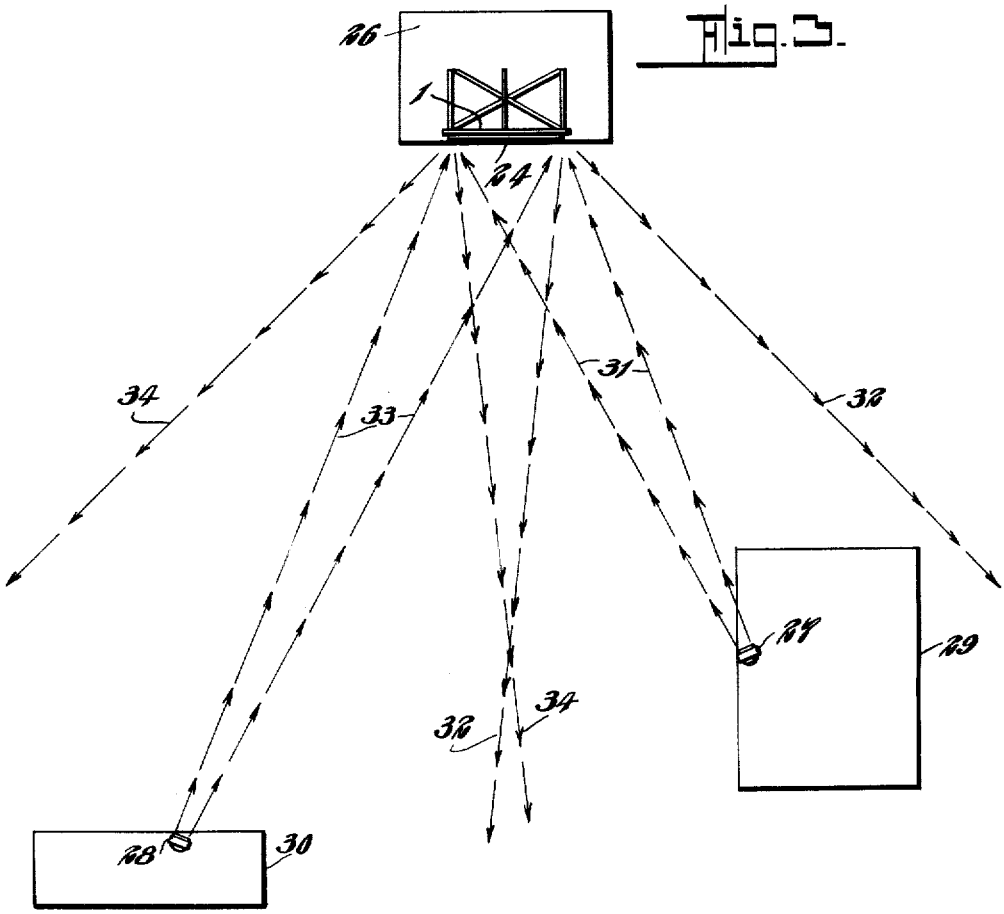
Figure 3 is a plan showing another embodiment of this invention.

Occasionally a sign is favorably located in a position where it may be viewed without obstruction over a large territory. Such a location may be secured on the top of a high building facing an open public square or at the intersection of wide avenues forming an acute angle. Such a location is shown in Figure 3 where the frame of the sign 1 containing the sign area 24 constructed as heretofore described is located on top of a building 26. In order to secure a distributed field, two or more spot-lights 27 and 28 are located to face the sign area, as by mounting the same on buildings 29 and 30 respectively. The spot-light 27 can be arranged so as to direct a beam 31 on the sign area, which beam will be reflected in the form of a spreading beam 32, while the beam 33 from the spot-light 28 is reflected in the form of a spreading beam 34. The elements may be so constructed and relatively arranged as heretofore described, that the light will be reflected from the display characters in the form of spreading beams into the selected visible field, the light from the display characters and incident from the several sources being reflected into selected adjacent visible field areas so as to confine the light reflected from the sign area and the display characters thereon within the visible field. By thus suitably arranging a series of spot-lights and by suitably constructing the sign area and the reflecting surfaces, any desired field of vision may be covered, but the light emanating from the character is confined within that field.

It will, therefore, be seen that the invention accomplishes its objects, for in accordance with this invention the light emitted from the sign area and the display characters thereon is limited and confined within the visible field. Accordingly the emitted light is transmitted where it will be observable, while it is excluded from outside spaces. It will, therefore, be seen that maximum efficiency is secured even with the losses incident to the employment of reflectors and refractors. Not only is the cost of installation low, but the maintenance cost is low for the reason that the sign area is rugged and will not deteriorate. Nor will the efficiency be impaired on account of the exposure to weather for the reason that the reflecting surfaces are in the rear where they can be protected. Where silvered plates are employed the reflectors may be sealed to the sign board or similarly treated so as to protect them from the weather. If transparent total reflecting plates are used little protection is necessary. It is to be noted in this connection that dust particles, if not in optical contact with the reflecting surfaces, will not impair the reflection but optical contact can readily be avoided by protecting the back against rain. The display sign is so constructed that any suitable characters in the form of letters, figures, illustrations and trade marks may be employed without resorting to block characters. Moreover any suitable color effect may be obtained as heretofore described by suitable coating applied to the sign area. A desired color effect may also be secured by introducing a color screen in the path of the beam from the spotlight or by passing a varied color screen therethrough. Elaborate flashing effects may also be secured by simply moving an opaque screen in the path of the beam from the spotlight, or by moving one containing perforations designed to secure the desired effect, or by using a semi-transparent screen containing gradations of shading. Furthermore the sign area may be converted and changed readily as heretofore described without great expense.

While a number of embodiments of this invention have been described and illustrated in an illustrative environment, it will be understood that this invention is susceptible of various embodiments and in various environments in the general art of reflecting signs to perform their useful functions in those environments. It is further obvious that various changes may be made in details without departing from the spirit of this invention; it is, therefore, to be understood that this invention is not to be limited to the specific details shown and described.

Having thus described the invention, what is claimed is:

1. A luminous display sign comprising, a reflecting area on which characters are displayed so as to be visible in front of said area, and a light source in front of and distant from said area adapted to direct the light on said area for reflection within a selected field, said reflecting area being composed of reflecting surfaces formed and positioned to cause a definite spread of the reflected light from said area and so as to confine the reflection within the selected field, in order that the characters may be visible to an observer anywhere within that field.

2. A luminous display sign comprising, a reflecting area on which characters are displayed so as to be visible in front of said area, and a light source in front of and distant from said area adapted to direct the light on said area for reflection within a selected field, said reflecting area being composed of a series of reflecting units arranged in contiguous relation and constructed and positioned to cause a definite spread of the reflected light therefrom and so as to confine the reflection within the selected field, in order that the characters may be visible to an observer anywhere within that field.

3. A luminous display sign comprising, a reflecting area on which characters are displayed so as to be visible in front of said area, and a light source in front of and distant from said area adapted to direct the light on said area for reflection within a selected field, said reflecting area being composed of a series of reflecting units arranged in contiguous relation, each of said units being constructed to direct a definite spreading beam of substantially uniform intensity into the selected field, and the composite beam from the several reflecting units being confined within the selected field, in order that the characters may be visible to an observer anywhere within that field.

4. A luminous display sign comprising, a reflecting area on which characters are displayed so as to be visible in front of said area, and a light source in front of and distant from said area adapted to direct the light on said area for reflection within a selected field, said reflecting area being composed of a series of reflecting units arranged in contiguous relation, each of said units having reflecting surfaces constructed to direct a definite spreading beam into the selected field and having means for distributing the reflected light uniformly throughout the field of spread, and the composite beam from the several reflecting units being confined within the selected field, in order that the characters may be visible to an observer anywhere within that field.

5. A luminous display sign comprising, a reflecting area on which characters are displayed so as to be visible in front of said area, and a series of light sources in front of and distant from said area adapted to direct the light from said area for reflection within selected adjacent fields, said reflecting area being composed of reflecting surfaces formed and positioned to cause a definite spread of the reflected light from said area and so as to confine the reflection within the selected fields, in order that the characters may be visible to an observer anywhere within those fields.

6. A luminous display sign having display characters visible from within a selected field, and a light source in front of and distant from said characters, said characters having reflecting surfaces arranged in relative angular relation to multiply reflect light impinging thereon back towards the light source in the form of a spreading beam or beams, said reflecting means being adapted to direct the reflected light into and confine the same to said field in order to display said characters within said field.

7. A luminous display sign having display characters visible from within a selected field, and a light source in front of and distant from said characters, said characters being formed by total reflecting prisms whose surfaces are arranged in angular relation to multiply reflect the light in the form of spreading beams into and confined within the selected field.

8. A luminous display sign having display characters visible from within a selected field, and a light source in front of and distant from said characters, said characters being formed by triple reflecting surfaces which deviate from their true right angular relation adapted to reflect the light into and within the selected field.

9. A luminous display sign having display characters visible from within a selected field, and a light source in front of and distant from said characters, said characters being formed by triple reflecting surfaces adapted to reflect light impinging thereon back towards the light source, and means cooperating with said surfaces adapted to slightly spread the reflected light to a definite degree in the form of a spreading beam or beams so as to confine the same within said field.

10. A luminous display sign having display characters visible from within a selected field, and means in front of and distant from said characters for directing light indiscriminately on said characters, said characters having triple reflectors whose reflecting surfaces deviate from their true right angular relation adapted to reflect the light impinging thereon so as to confine the same within said field.

11. A luminous display sign having display characters visible from within a selected field, and means in front of and distant from said characters for directing light from a source on the display characters, said characters being reflecting surfaces arranged in relative angular relation to multiply reflect the light impinging on said display characters back towards said source, and means cooperating with said surfaces adapted to slightly spread the reflected light to a definite degree in the form of a spreading beam or beams into said field.

12. A reflecting sign having a sign character provided with reflecting units arranged to form an outline of the character, each of said units having a reflecting area adapted to reflect light incident thereon from a distant source back in the general direction of the light source and having means adapted to slightly spread the reflected light.

13. A reflecting sign having a sign character provided with reflecting units arranged along the strokes of the character, each of said units having a reflecting area adapted to reflect light incident thereon from a distant source back in the general direction of the light source and having means adapted to slightly spread the reflected light.

14. A reflecting sign having a sign character provided with clusters of reflecting units arranged to form an outline of the character, each of said units having a reflecting area adapted to reflect light incident thereon from a distant source back in the general direction of the light source and having means adapted to slightly spread the reflected light.

15. A reflecting sign having a sign character provided with clusters of reflecting units arranged to form an outline of the character, each cluster being composed of a series of units arranged in contiguous relation, each of said units having a reflecting area adapted to reflect light incident thereon from a distant source back in the general direction of the light source and having means adapted to slightly spread the reflected light.

16. In a reflecting sign, the combination with a reflecting area consisting of a number of prisms, whose opposite sides meet at substantially right angles at their apices and which are adapted to reflect light incident thereon from a distant source back in the general direction of the light source and which have means adapted to slightly spread the reflected light, of means for blocking out portions of the reflecting area to form a design.

17. In a reflecting sign, a single plate of glass having on one side a reflecting area consisting of a number of prisms, whose opposite sides meet at substantially right angles at their apices and which are adapted to reflect light incident thereon from a distant source back in the general direction of the light source and which have means adapted to slightly spread the reflected light, said plate having on its other side means for blocking out portions to form a design.

18. In a reflecting sign the combination with a reflecting area consisting of a number of substantially right angled tetrahedra, said tetrahedra adapted to reflect light incident thereon from a distant source back in the general direction of the light source and having means adapted to slightly spread the reflected light, of means for blocking out portions of the area to form a design.

19. In a reflecting sign, the combination with a reflecting area consisting of a sheet of plate glass on which are formed a number of prisms whose opposite sides meet at substantially right angles at their apices and which are adapted to reflect light incident thereon from a distant source back in the general direction of the light source and which have means adapted to slightly spread the reflected light, of means for blocking out portions of the reflecting area to form a design.

20. In a reflecting sign, the combination with a reflecting area consisting of a sheet of plate glass on which are formed a number of substantially right angled tetrahedra, said tetrahedra adapted to reflect light incident thereon from a distant source back in the general direction of the light source and having means adapted to slightly spread the reflected light, of means for blocking out portions of the reflecting area to form a design.

21. In a reflecting sign, a plate of glass having on one side thereof a plurality of tetrahedral prisms, said prisms adapted to reflect light incident thereon from a distant source back in the general direction of the light source and having means adapted to slightly spread the reflected light, said plate having on its other side an opaque coating disposed to block out a sign substantially as and for the purpose described.

5 In testimony whereof I affix my signature this 13th day of June, 1931.

JONATHAN C. STIMSON.

CERTIFICATE OF CORRECTION.

Reissue Patent No. 18,166. Granted August 25, 1931, to

JONATHAN C. STIMSON.

It is hereby certified that error appears in the printed specification of the above numbered patent requiring correction as follows: Page 2, line 80, for "continuous" read contiguous, and line 81, for "th" read the; and that the said Letters Patent should be read with these corrections therein that the same may conform to the record of the case in the Patent Office.

Signed and sealed this 29th day of September, A. D. 1931.

(Seal)

M. J. Moore,
Acting Commissioner of Patents.